US006842792B2

(12) United States Patent
Johnson et al.

(10) Patent No.: US 6,842,792 B2
(45) Date of Patent: Jan. 11, 2005

(54) METHOD AND/OR APPARATUS TO SORT REQUEST COMMANDS FOR SCSI MULTI-COMMAND PACKETS

(75) Inventors: Stephen B. Johnson, Colorado Springs, CO (US); Bradley D. Besmer, Colorado Springs, CO (US); Guy W. Kendall, Colorado Springs, CO (US); Christopher J. McCarty, Colorado Springs, CO (US); Andrew C. Brown, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 229 days.

(21) Appl. No.: 10/183,670

(22) Filed: Jun. 27, 2002

(65) Prior Publication Data

US 2004/0003144 A1 Jan. 1, 2004

(51) Int. Cl.[7] ............................................... G06F 13/14
(52) U.S. Cl. ............................... 710/5; 710/6; 709/232; 711/119
(58) Field of Search ......................... 710/5, 6; 709/232; 711/119

(56) References Cited

U.S. PATENT DOCUMENTS

| | | | | |
|---|---|---|---|---|
| 6,105,103 A | * | 8/2000 | Courtright et al. ............. 711/1 |
| 6,138,176 A | * | 10/2000 | McDonald et al. ............. 710/6 |
| 6,199,107 B1 | * | 3/2001 | Dujari ......................... 709/219 |
| 6,574,709 B1 | * | 6/2003 | Skazinski et al. ............ 711/119 |
| 2003/0088734 A1 | * | 5/2003 | Cavallo et al. ............... 711/114 |
| 2003/0208614 A1 | * | 11/2003 | Wilkes ....................... 709/232 |

OTHER PUBLICATIONS

American National Standard of Accredited Standards Committee INCITS, Information Technology SCSI Parallel Interface–4 (SPI–4), Document T10, Project 1365D, Revision 9, Jan. 30, 2002, pp. 1–382.

* cited by examiner

Primary Examiner—A. Elamin
(74) Attorney, Agent, or Firm—Christopher P. Maiorana, P.C.

(57) ABSTRACT

An apparatus comprising a plurality of IO queues and a logic circuit. The plurality of IO queues each may be configured to receive a respective IO request and present the IO request in response to a trigger signal. The logic circuit may be configured to (a) (i) receive one or more of the IO requests and (ii) serially coalesce the IO requests in response to a respective device identification (ID) of the IO requests, and (iii) present one or more of the coalesced IO requests as one or more respective context queue requests in response to the trigger signal and (b) generate the trigger signal when a current queue count is equal to a maximum queue depth.

20 Claims, 3 Drawing Sheets

METHOD AND/OR APPARATUS TO SORT REQUEST COMMANDS FOR SCSI MULTI-COMMAND PACKETS

FIELD OF THE INVENTION

The present invention relates to hardware bus protocols generally and, more particularly, to a method and/or apparatus to sort request commands for multiple command packets.

BACKGROUND OF THE INVENTION

Conventional integrated circuit (i.e., chip) input/output (IO) controllers use multi-processor designs that include an input/output processor (IOP) and one or more context manager (CTX) processors. The context managers include the processor and all of the dedicated hardware components of the bus (or protocol) channel. The IOP and each of the CTX processors include dedicated sets of firmware. The IOP (i) receives Message Passing Technology (MPT) request messages from a host operating system (OS) device driver, (ii) performs some processing on the messages, and (iii) transmits the messages to the CTX processors. The context managers handle the dedicated bus protocol (i.e., SCSI, Fibre Channel, Serial ATA, etc.) of the chip. In a dual channel (i.e., dual bus) design, there is a context manager dedicated to each channel.

The OS and the IOP communicate via a set of dedicated system request and system reply first in, first out registers (FIFOs) that are included in the IO controller. In a dual channel controller there is a dedicated set of the system request FIFOs and system reply FIFOs for each peripheral computer interconnect (i.e., PCI, PCI-X, PCI-X DDR, etc.) function. Each PCI function has a one to one relation with a CTX channel (i.e., PCI function 0 is dedicated to channel 0 and PCI function 1 is dedicated to channel 1). The IOP receives pointers to messages that are posted by the OS on the system request FIFOs and presents the pointers to the corresponding CTX processor.

The small computer systems interface (SCSI) bus protocol was developed as a simple and efficient method of connecting one or more peripherals to a personal computer (PC) and/or a server computer. An IO controller that implements the SCSI protocol can set a SCSI parallel interface SPI L_Q information unit type field to multiple (or multi-) command (i.e., multiple commands or multiple IO requests can be sent to the respective device in the same connection). The American National Standard of Accredited Standards Committee INCITS, Information technology SCSI Parallel Interface-4 (SPI-4), document T10, Project 1365D, Revision 9, 30-Jan. -2002, which is incorporated herein by reference in its entirety, provides the relevant details of the multi-command mode.

Each of the context managers has a dedicated set of inter-processor (IP) queues that are used for communication between the context manager and the IOP. The context managers do not communicate between each other, but only communicate with the IOP. When the IOP has completed processing a request message from the OS, the IOP sends the message to the CTX by posting the message on the inter-processor IO request queue. When the CTX has completed processing the message (or IO), the CTX replies back to the IOP with the status of the IO via the inter-processor IO completion queue. The IOP (i) receives replies from each of the context managers via the IO completion queues, (ii) performs some cleanup, and (iii) sends the status back to the OS via the system reply FIFO.

Referring to FIG. 1, a detailed block diagram illustrating a conventional OS driver and IO controller circuit 10 is shown. The circuit 10 includes an OS driver 12, a PCI bus 14, and an IO controller 16. The host OS device driver 12 is coupled to the IO controller 16 via the PCI bus 14. The OS driver 12 includes a first plurality of message frames 20a–20n, a second plurality of message frames 22a–22n, a first host interface 24, and a second host interface 26. The controller 16 includes a first plurality of PCI function registers 30a–30n, a second plurality of PCI function registers 32a–32n, a request FIFO 34, a message assist engine 36, a free FIFO 38, a plurality of message frames 40a–40n, an IOP 42, a first inter-processor queue that includes an IO request register 44a and an IO completion register 46a, a second IP queue that includes an IO request register 44b and an IO completion register 46b, a first CTX manager 48a, a second CTX manager 48b, a first SCSI core 50a, a second SCSI core 50b, and a reply FIFO 52.

The following steps describe the flow of an IO message between the OS device driver 12, the IOP 40 and the CTX managers 48:

Step A

The host OS driver 12 generates a SCSI (or other appropriate protocol) IO message in the host address space 20.

Step B

The host OS driver 12 posts a system message frame address (SMFA) to the PCI function request register 30 via the host interface 24 and the bus 14.

Step C

The PCI function request register 30 presents the SMFA to the request FIFO 34.

Step D

The request FIFO 34 presents the SMFA to the message assist engine 36.

Step E

The message assist engine 36 waits for a local message frame address (LMFA) in the local message frame 40 to become free.

Step F

The message assist engine 36 presents (i.e., direct memory addresses) the system message frame SMFA to the local message frame 40.

Step G

The message assist engine 36 writes the LMFA to the request FIFO 34.

Step H

The IOP 42 polls the interrupt status register for the request queue (i.e., the free FIFO 38) for a new request and receives the LMFA.

Step I

The IOP 42 examines the message header function to determine the type of message addressed by the LFMA. When the message is an SCSI IO request and the message is tagged as a request, the message is assigned a Qtag.

Step J

The IOP 42 posts a message index (MID) on the inter-processor IO request queue 44.

Step K

The CTX manager 48 polls an internal interrupt status register (i.e., the IO request queue 44) for a new request (i.e., MID).

Step L

The CTX manager 48 writes the message index MID into a context lookup table and writes a copy of the message to the SCSI core IO bucket 50.

Step M

The CTX manager 48 completes the IO by posting the unmodified MID on the IO completion queue 46.

Step N

When an error in the IO flow is indicated, the CTX manager 48 sets an exception bit in the MID indicating the message frame 40 has error status data. The IOP 42 polls the IO completion queue 46 interrupt status register and receives the MID.

Step O

When successful IO flow is indicated, the IOP 42 posts an unmodified message context to the reply FIFO 52 using a function bit in the MID to determine which function to implement.

When an error in the IO flow has been indicated, The IOP 42 presents (i.e., direct memory accesses) a reply frame to a host reply buffer and posts a ready for data signal (e.g., RFD) to the reply FIFO 52.

Step P

The IOP 42 frees the LMFA in the free FIFO 38.

Step Q

The host OS driver 12 receives an interrupt message (INTERRUPT) for a reply.

The IOP 42 performs an intermediary function between the OS driver 12 and the CTX managers 48*a* and 48*b*. During a normal mode of operation, the IOP 42 (i) continually receives IO requests from the OS 12, (ii) presents the IO requests to the CTX managers 48, (iii) receives IO completions from the CTX managers 48, and (iv) presents the IO completions to the OS 12.

When the IOP 42 firmware receives an IO request (i.e., a SMFA that corresponds to an IO request) from the operating system driver 12, the IOP 42 sorts the requests by device identification (ID) (i.e., a respective SCSI core 50) and posts the IO requests to the respective IP queue 44 (i.e., as a respective message index signal MID). A particular IP queue 44 only receives IO requests for a given device ID. The system 10 is configured having a dedicated (or respective) IP queue 44 per device ID.

Conventional approaches to handling IO requests include checking the next IO request to determine if the IO request accesses the same device ID as the current IO request. Conventional approaches check the IO requests in the order that the IO requests have been sent to the controller 16 by the host operating system 12. However, many conventional operating systems 10 do not send IO requests ordered by the respective devices. Furthermore, the conventional operating systems 10 that send IO requests ordered by devices are not maximized since the SPI L_Q command was developed after most operating system device drivers were developed.

It would be desirable to have a method and/or apparatus that (i) sorts IO requests by device ID and sends SPI L_Q information unit multi-commands to the respective devices, (ii) reduces and/or eliminates performance penalties and/or extra processing overhead in the IOP and context manager firmware on a SCSI MPT based controller, and/or (iii) maximizes the SPI L_Q command feature while not hindering the operation and/or performance of the operating system driver.

SUMMARY OF THE INVENTION

The present invention concerns an apparatus comprising a plurality of IO queues and a logic circuit. The plurality of IO queues each may be configured to receive a respective IO request and present the IO request in response to a trigger signal. The logic circuit may be configured to (a) (i) receive one or more of the IO requests and (ii) serially coalesce the IO requests in response to a respective device identification (ID) of the IO requests, and (iii) present one or more of the coalesced IO requests as one or more respective context queue requests in response to the trigger signal and (b) generate the trigger signal when a current queue count is equal to a maximum queue depth.

The objects, features and advantages of the present invention include providing a method and/or apparatus that implements hardware and/or embedded firmware on a small computer systems interface (SCSI) Message Passing Technology (MPT) based controller that may (i) sort input/output (IO) requests by device identifications (IDs) and send multi-command SCSI parallel interface (SPI) L_Q information units to the respective devices, (ii) minimize and/or eliminate performance penalties, (iii) minimize and/or eliminate processing overhead in the IO processor and context manager firmware, (iv) maximize performance and operation of the operating system device driver, (v) reduce and/or eliminate IO queue starvation that can occur during coalescing, (vi) preserve the device ID order of IO requests from the host, and/or (vii) provide improved overall throughput.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
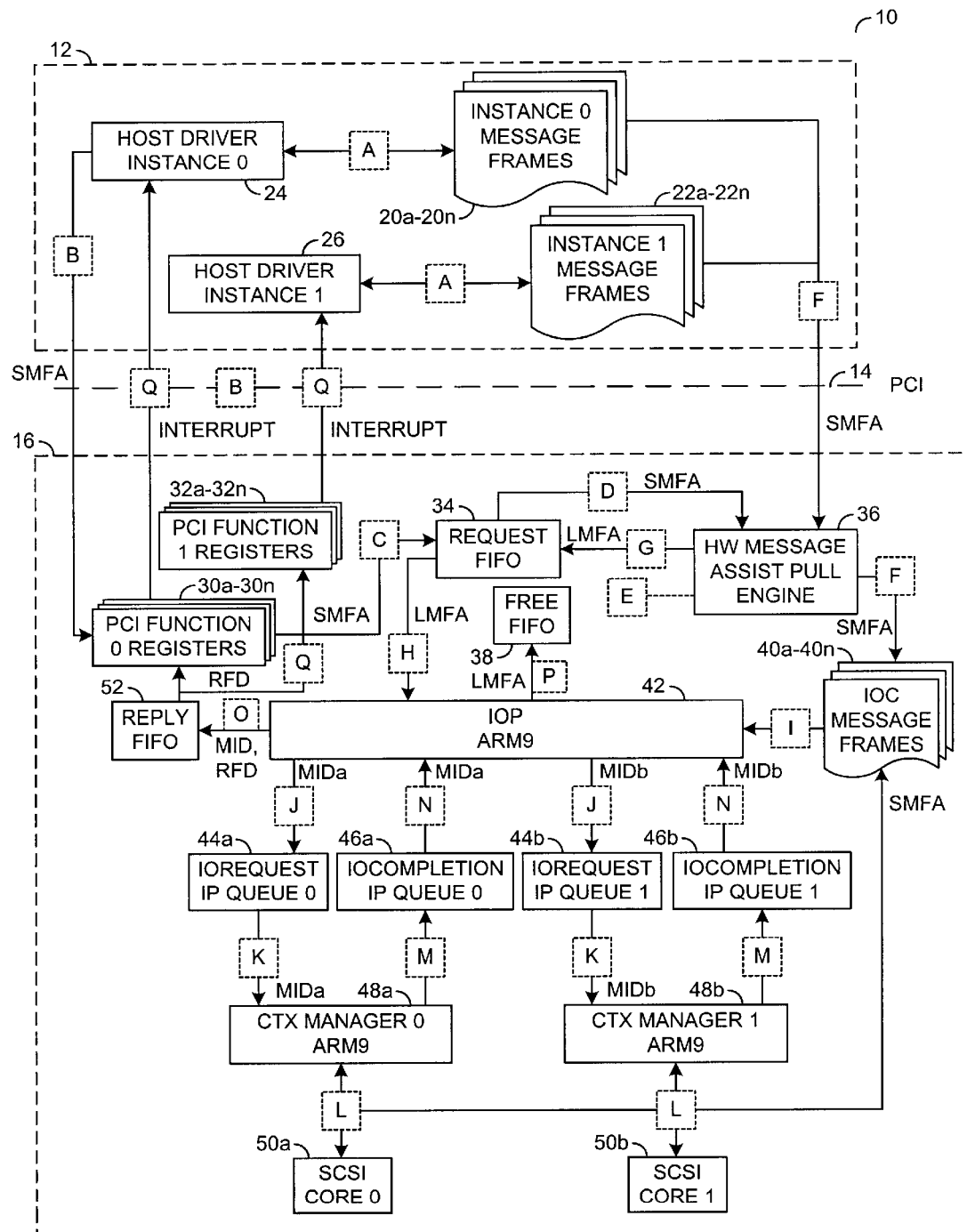
FIG. 1 is a block diagram of a conventional multi-processor controller circuit.
Figure 2:
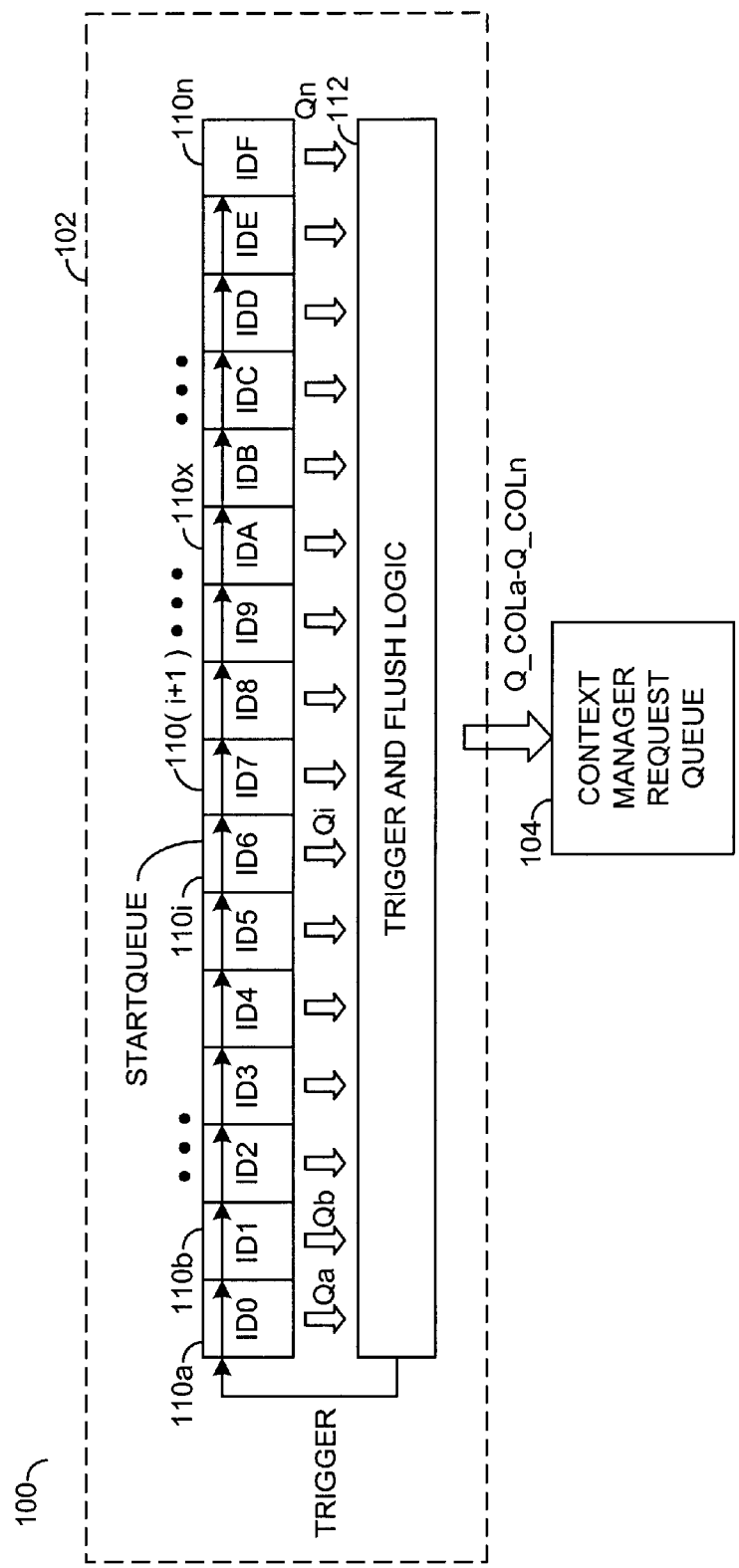
FIG. 2 is a block diagram of a preferred embodiment of the present invention.

Referring to FIG. 2, a diagram illustrating a circuit 100 in accordance with a preferred embodiment of the present invention is shown. The circuit 100 may be implemented as an inter-processor (IP) queue manager. In one example, the circuit 100 may be implemented in the context of a multi-processor controller circuit (not shown) similar to the circuit 10. The circuit 100 may be configured to sort request commands for small computer systems interface (SCSI) multiple (or multi-) command information units (or packets). In one example, the circuit 100 may coalesce (e.g., combine into a single unit or packet) a plurality of separate device identification (ID) queue input/output (IO) requests that reference (or correspond to) the same device into a single IO request queue that may be accessed (or read) by a context (CTX) manager. The sorted and coalesced IO requests may be compatible with and processed via a SCSI parallel interface (SPI) L_Q information unit set to a multiple (or multi-) command as described in the SCSI Parallel Interface-4 (SPI-4) document.

The circuit 100 may be implemented as an IO request queue circuit (e.g., a circuit that may be similar to the circuit 44 of the circuit 10). The circuit 100 may be implemented between (e.g., inter-) the IOP 42 and the CTX manager 44 processor. However, the circuit 100 may be implemented in connection with any appropriate controller circuit and/or protocol to meet the design criteria of a particular application.

In one example, the circuit 100 may comprise a hardware based state machine. The circuit 100 is generally configured to operate in parallel with a controller circuit input/output processor (IOP) similar to the IOP 42 and one or more CTX manager processors similar to the CTX managers 48 such that the performance of the controller where the circuit 100 is implemented is enhanced (e.g., faster, more efficient, improved overall throughput, etc.) when compared to conventional approaches. However, the circuit 100 may be implemented as any appropriate software, firmware, hardware, and/or combination thereof to meet the design criteria of a particular application.

The circuit 100 generally comprises a circuit 102 and a circuit 104. The circuit 102 may be implemented as an IO device request queue and logic circuit. The circuit 104 may be implemented as a CTX manager request queue circuit. The circuit 102 may be configured on the sender (e.g., the IOP) side of the circuit 100 and the circuit 104 may be configured on the receiver (e.g., the CTX manager) side of the circuit 100. The circuit 102 generally presents one or more signals (e.g., Q_COLa–Q_COLn) to the circuit 104. The circuit 104 is generally coupled to a respective CTX manager (not shown) configured to receive the signal Q_COL.

The signals Q_COLa–Q_COLn may be implemented as sorted and coalesced (e.g., multiple signals combined into one signal) queue request signals. The signal Q_COL generally comprises one or more device queue IO requests that have been sorted to reference a single IO device and coalesced to a single queue IO request command signal. The signal Q_COL is generally compliant with the SCSI parallel interface (SPI) L_Q information unit set to (or selected as) the multiple (or multi-) command. However, the signal Q_COL may comprise (i) a single IO request (e.g., each successive IO request references a different IO device) or (ii) a sequential series of IO requests when the operating system (OS) driver (e.g., an OS driver similar to the OS driver 12) presents an IO request or series of IO requests to the IP queue manager 100 and waits for a reply prior to presenting a subsequent IO request.

The circuit 102 generally comprises a plurality of circuits 110 (e.g., 110a–110n) and a circuit 112. The circuits 110a–110n may be implemented as device queues. The device queues 110 may be configured as first-in, first-out (FIFO) circuits (or registers). In one example, the circuit 102 may be implemented having sixteen of the circuits 110 (e.g., ID0–IDF). However, the circuit 102 may be implemented having any appropriate number of the circuits 110 to meet the design criteria of a particular application. The circuits 110a–110n and the circuit 104 are generally implemented as queues and/or FIFOs comprising pointers (e.g., 16-bit, 32-bit, or any appropriate size pointers) configured to point to a respective IO request.

Each of the circuits 110 generally receives a respective IO request (e.g., a signal, not shown, that may be implemented similarly to the message index signal MID), a signal (e.g., TRIGGER), and presents a respective signal Q (e.g., signals Qa–Qn) to a respective input of the circuit 112. The signal TRIGGER may be implemented as a control signal. The signal TRIGGER may be configured to control a flush and release operation of the circuit 100. The flush and release operation may be implemented as an operation (or process) where (i) one or more selected circuits 110 sequentially (or serially) present the respective selected signal Q to the circuit 112 and (ii) the sorted (e.g., sorted by device ID) and coalesced signals Q are presented by the circuit 112 to the circuit 104 as the signal Q_COL. The signal Q may be implemented as a device queue request command signal (e.g., a signal that generally corresponds to a respective message index signal). Each signal Q generally comprises a respective device identification (ID).

The circuit 112 may be implemented as a trigger and flush logic (TFL) circuit. In one example, the circuit 112 may be implemented as a hardware based state machine that is configured to control the sort, coalesce and flush process of the circuit 100. The circuit 112 may be configured to generate and/or present the signals Q_COLa–Q_COLn in response to the respective signals Q and the signal TRIGGER. The circuit 112 may be configured generate and/or present the signal TRIGGER in response to a number of variables (e.g., parameters, signals, and/or values) (e.g., MAXQUEUEDEPTH, TOTALCOUNT, MAXTOTALCOUNT, TIME, TRIGGERTIME, MINTRIGGERTIME, MAXTRIGGERTIME, TRIGGERTIMECOUNT, MAXTRIGGERTIMECOUNT, NEWREQUEST, CURRENTQUEUE, and/or STARTQUEUE).

The value MAXQUEUEDEPTH may be implemented as a maximum ID queue depth (e.g., the number of circuits 110 that have been implemented in the particular circuit 102). However, the number MAXQUEUEDEPTH may be implemented having any appropriate value to meet the design criteria of a particular application. The signal (or value) TOTALCOUNT may be implemented as a total number of IO requests pending on all of the ID queues 110. The value (or signal) MAXTOTALCOUNT may be implemented as (i) a maximum number of IO requests that may be presented to a particular IO device or (ii) the maximum number of all IO requests that may be permitted to reside in the circuit 100 at a given time. The value MAXTOTALCOUNT is generally a predetermined value that may be related to one or more characteristics and/or parameters of the system where the circuit 100 is implemented. The signal TIME may correspond to a time since a last assertion of the signal TRIGGER.

The signal TRIGGERTIME may be implemented as a time at which to assert the signal TRIGGER. The signal MINTRIGGERTIME may be implemented as a minimum trigger time value (e.g., a minimum elapsed time permitted before asserting the signal TRIGGER). The signal MAXTRIGGERTIME may be implemented as a maximum trigger time (e.g., a maximum elapsed time permitted between assertions of the signal TRIGGER) The values of the signals MINTRIGGERTIME and MAXTRIGGERTIME are generally predetermined. The value TRIGGERTIMECOUNT may be implemented as a number of times in a row that the signal TRIGGER was asserted in response to the value (or signal) TRIGGERTIME. The value MAXTRIGGERTIMECOUNT may be implemented as a predetermined maximum number of times in a row that the signal TRIGGER may be asserted.

The signal NEWREQUEST may be implemented to indicate that the circuit 100 (and/or a particular device queue 110) has received an IO request subsequent to a flush and release operation. The signal CURRENTQUEUE may indicate a particular device queue 110 that is currently being polled (or checked) by the TFL circuit 112 (e.g., the IO queue 110 that corresponds to an IO request to a given device ID). The signal CURRENTQUEUE generally has a corresponding count value (e.g., CURRENTQUEUE.COUNT) that may represent the respective number of IO requests that have been presented to the circuit 100 since the last flush operation. The signal STARTQUEUE may indicate a first ID queue 110 to receive an IO request command (or signal) after a flush and release operation. The next flush and release operation that is performed via the circuit 100 generally starts with the queue 110 indicated by the signal STARTQUEUE. The signals of the present invention that correspond to time and/or elapsed time (e.g., TIME, TRIGGERTIME, etc.) may be implemented as a relative time or as an absolute time to meet the design criteria of a particular application.

Figure 3:
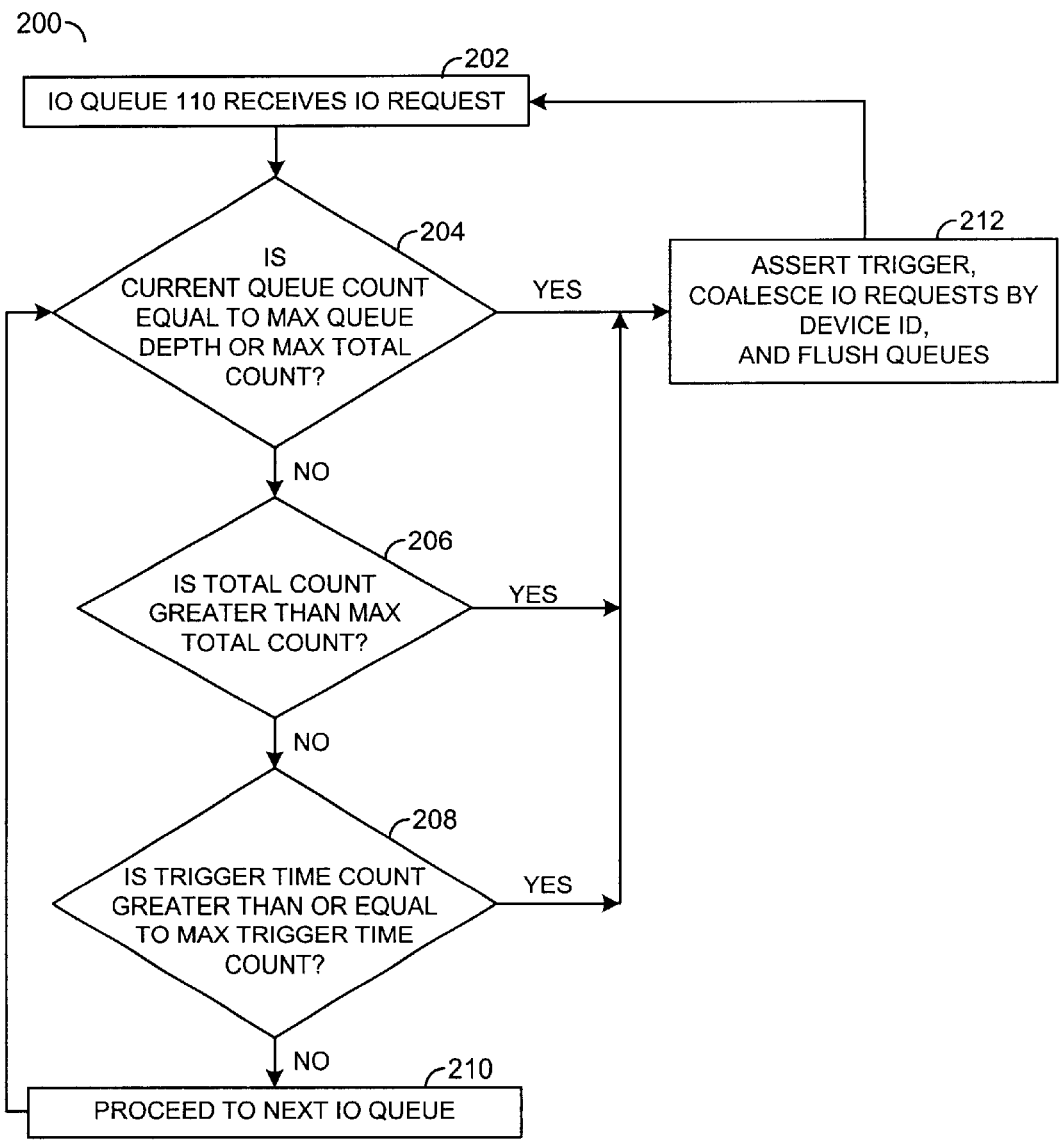
FIG. 3 is a flow diagram of a sort and flush operation of the present invention.

Referring to FIG. 3, a flow diagram illustrating a sort, flush and release operation 200 in accordance with the present invention is shown. The operation (e.g., process, method, routine, etc.) 200 generally comprises a state (or block) 202, a decision state (or block) 204, a decision state (or block) 206, a decision state (or block) 208, a state (or block) 210, and a state (or block) 212.

In one example, when a device queue 110$i$ receives an IO request (e.g., the state 202), the circuit 112 (e.g., the method 200) may be configured to check (e.g., poll, monitor, etc.) the device IO queue 110 indicated (or selected) by the signal STARTQUEUE (e.g., the device queue 110$i$) and the method 200 may continue to the decision state 204.

During the decision state 204, the circuit 112 may determine whether or not the value CURRENTQUEUE.COUNT (e.g., an indication of which location in the series of device queues 110 the device queue 110 that is being checked is located or the number of IO requests to a particular device ID) is equal to the value MAXQUEUEDEPTH (e.g., the last queue 110$n$) or the value MAXTOTALCOUNT. The decision state 204 may be configured to determine (i) whether or not the method 100 has reached the end of the series of circuits 110 (e.g., the circuit 110$n$) and/or (ii) the value of the signal CURRENTQUEUE.COUNT has reached the value MAXTOTALCOUNT. If the signal (or value) CURRENTQUEUE.COUNT does not equal the value MAXQUEUEDEPTH or the value MAXTOTALCOUNT, the process 200 generally continues to the decision state 206.

During the decision state 206, the circuit 112 may determine whether or not the value TOTALCOUNT is greater than the value MAXTOTALCOUNT. If the signal (or value) TOTALCOUNT is not greater than the value MAXTOTALCOUNT, the process 200 generally continues to the decision state 208. During the decision state 208, the TFL circuit 112 may determine whether or not the value TRIGGERTIMECOUNT is greater than or equal to the value MAXTRIGGERTIMECOUNT. If the signal (or value) TRIGGERTIMECOUNT is not greater than or equal to the value MAXTRIGGERTIMECOUNT, the process 200 generally continues to the state 210. At the state 210, the circuit 112 may be configured to check the next device queue (e.g., proceed to the device queue 110 (i+1)). The method 200 may return to the decision state 204 and the TFL circuit 112 may check (or poll) the device queue 110(i+1).

The IO request device check steps (e.g., the steps 204-208) generally proceed serially (e.g., left to right, lowest to highest, etc.) from the circuit 110$i$ through each of the IO device queues 110 sequentially until the circuit 112 encounters a condition where (i) during the state 204 the circuit 110 that is checked is the last circuit 110 in the circuit 102 (e.g., the circuit 110$n$ as determined by the value MAXQUEUEDEPTH), (ii) during the state 204 the number of IO requests that correspond to a respective device ID reaches the maximum permitted value (e.g., the signal CURRENTQUEUE.COUNT equals the value MAXTOTALCOUNT), (iii) during the state 206 the value TOTALCOUNT is greater than the value MAXTOTALCOUNT (e.g., a value at a circuit 110$x$), and/or (iv) during the state 208 the signal TRIGGERTIMECOUNT is greater than or equal to the signal MAXTRIGGERTIME (e.g., a predetermined time between flush and release operations has been met or exceeded).

When one or more of the conditions (i)-(iv) are met (and/or exceeded) and the signal TRIGGERTIMECOUNT is equal to or greater than the parameter MINTRIGGERTIME (not shown), the method 200 generally transitions to the state 212 where (i) the circuit 112 generally asserts the signal TRIGGER and (ii) the respective circuits 110 (e.g., the respective circuits 110$i$-110$x$, the circuits 110$i$-110$n$, etc.) and the circuit 104 are flushed and released in response to the signal TRIGGER. The flush and release portion of the operation 200 (e.g., the state 212) generally comprises (i) serially loading the respective selected signals Q into the TFL circuit 112 (e.g., selecting and sorting the IO requests in response to the respective device ID), (ii) presenting the selected signals Q sequentially sorted and coalesced as the signal Q_COL in compliance with the SPI L_Q format from the circuit 112 to the circuit 104, and (iii) presenting the signal Q_COL from the circuit 104 to the respective CTX manager. The sort, flush and release operation 200 may also further comprise resetting the values of the signals CURRENTQUEUE.COUNT, TRIGGERTIMECOUNT, and/or TOTALCOUNT to zero. The signal TRIGGERTIME may also be reset to the value MINTRIGGERTIME. When the parameter TRIGGERTIMECOUNT is less than the value MINTRIGGERTIME, the circuit 100 generally waits an appropriate time before the signal TRIGGER is asserted. The signals CURRENTQUEUE.COUNT, TRIGGERTIMECOUNT, and/or TOTALCOUNT are generally incremented during one or more of the states 204-208 (e.g., prior to the flush state 212). When the state 212 is complete, the method 200 generally returns to the state (or step) 202.

All of the queues 110 selected during the states 202-210 are generally flushed and the coalesced signals Q are generally released (e.g., as the signal Q_COL) in a serial fashion substantially simultaneously to prevent starvation of a particular device ID and/or IO path. The variable (or signal) STARTQUEUE may be configured to select (or indicate) the first queue 110 to be flushed (and the first signal Q to be released) and flushing generally continues sequentially with each ID queue 110 from left to right. In one example, the circuit 100 flushing operation may proceed from the circuit 110$i$, to the circuit 110(i+1), continuing on to the circuit 110$x$ and/or the circuit 110$n$. The sort, coalesce, flush, and/or release routine 200 generally preserves the order that the IO requests are presented to the circuit 100 from the host where the routine 200 is implemented per device ID. The circuit 100 is generally configured to reorder the respective pointers that correspond to the IO requests (e.g., the order of the IO requests per each respective device ID) during the sort and flush operation of the process 200.

In one example operation, when five IO requests (e.g., IO requests A, B, C, D, and E as described below) are presented by the host where the circuit 100 (and/or the method 200) is implemented and the value of the parameter MAXTOTALCOUNT is set (e.g., fixed, predetermined, programmed, etc.) as three, the circuit 100 may execute the routine 200 as follows. The IO requests A-E may correspond to the following IO device IDs.

| IO REQUEST | IO DEVICE ID |
| --- | --- |
| A | 0 |
| B | 1 |
| C | 0 |
| D | 1 |
| E | 0 |

The circuit 112 generally polls the IO queue circuit 110 that corresponds to the IO request A (e.g., executes the steps 202 through 210). One or more of the signals CURRENTQUEUE.COUNT, TRIGGERTIMECOUNT, and/or TOTAL COUNT may be appropriately incremented (e.g., the value of the signal CURRENTQUEUE.COUNT that corresponds to the device having the ID 0 may equal 1 and the value of the parameter TOTALCOUNT may equal 1).

Since none of the conditions that initiate the trigger, coalesce, and flush operations of the step (or block) 212 have yet occurred, the routine 200 (via the circuit 112) generally proceeds to the next IO request (e.g, the IO request B). The method 200 generally executes the steps 204–210. The value of the signal CURRENTQUEUE.COUNT that corresponds to the device having the ID 0 may remain equal to 1. The value of the signal CURRENTQUEUE.COUNT that corresponds to the device having the ID 1 may be incremented to equal 1. The value of the parameter TOTALCOUNT may be incremented to equal 2. The operation 200 generally proceeds to the next IO request (e.g., the IO request C) and the steps 204–210 may be repeated.

The operation 200 generally repeats the steps 204–210 until the IO request E is processed. When the IO request E is processed, during the execution of the step (or block) 204 the value of the parameter CURRENTQUEUE.COUNT that corresponds to the device ID 0 is equal to 3. Since the parameter MAXTOTALCOUNT is equal to 3, the method 200 generally proceeds to the step (or block) 212.

During the step 212, in response to the signal TRIGGER the circuit 112 generally coalesces the IO requests A, C and E serially (e.g., in the order A, C, and E as presented by the host) into the respective signal Q-COL (e.g., Q__COLa). The circuit 112 generally coalesces the IO requests B and D serially into the respective signal Q__COL (e.g., Q__COLn). The circuit 112 generally loads (e.g., presents, transfers, etc.) the signals Q__COLa–Q__COLn to the CTX manager request queue circuit 104. The circuit 104 generally sequentially (or serially) presents the coalesced IO requests (e.g., the signals Q__COLa–Q__COLn) to the respective CTX managers. The signals CURRENTQUEUE.COUNT, TRIGGERTIMECOUNT, MINTRIGGERTIME, and/or TOTALCOUNT are generally reset to the appropriate values.

As illustrated in the above example, the IO requests (such as the requests A–E) that are presented by the host generally correspond to non-contiguous device IDs. However, the present invention (e.g., the circuit 100 and/or the method 200) is generally configured to sort and/or coalesce the non-contiguous device ID requests. The signals Q__COL may each correspond to a respective device ID. The sort operation of the present invention generally preserves the order at which the IO requests are presented by the host per each respective device ID. As such, the sorted and coalesced signals Q__COL of the present invention generally contribute to processing the IO requests more efficiently (e.g., with faster throughput) than conventional approaches while generally preserving the device IO request order.

In response to the signal TRIGGER, (i) the circuits 110-110*x* (or 110*i*–110*n*) generally serially release (or present) the ID request signals Q (e.g., Qi–Qx or Qi–Qn, respectively), (ii) the circuit 112 generally sorts, coalesces and releases (or presents) the signals Q as the respective signal Q__COL, and (iii) the circuit 104 generally releases (or presents) the signal Q__COL to the respective CTX manager. The SPI L__Q multiple command is generally invoked.

In another example (e.g., when the next device queue 110 identified (or selected) by the signal NEWREQUEST has a different device ID than the immediately previously flushed device ID), (i) the circuit 112 may assert the signal TRIGGER, (ii) the respective circuit 110 indicated by the signal NEWREQUEST may present (or release) the signal Q to the circuit 112, (iii) the circuit 112 may present (or release) the signal Q__COL as the signal Q to the circuit 104, and (iv) the circuit 104 may present (or release) the signal Q__COL to the respective CTX manager. The SPI L__Q multiple command may not be invoked.

In one example, the circuit 112 decision logic that is configured to generate the signal TRIGGER may be implemented via software, firmware, hardware, and/or a combination thereof that is generally configured to operate as described by the following C programming language pseudo code routine. The hardware queue manager TFL circuit 112 may execute the following predetermined (or programmed) routine each time the IOP where the circuit 100 is implemented posts (or presents) a new IO request (e.g., the signal NEWREQUEST) on (or to) an ID queue 110. The following routine may be configured to implement one or more of the steps 202–212 of the method 200.

```
NEWREQUEST(CURRENTQUEUE)
{
    TOTALCOUNT = TOTALCOUNT + 1;
    If (TOTALCOUNT = 1)
        STARTQUEUE = CURRENTQUEUE;
    If (CURRENTQUEUE.COUNT == MAXQUEUEDEPTH ) ||
    (TOTALCOUNT > MAXTOTALCOUNT )
    {
        TRIGGERTIME = MAXTRIGGERTIME;
        TRIGGERTIMECOUNT = 0;
        TRIGGER ( );
    }
    Else If (TIME >= TRIGGERTIME )
    {
        TRIGGERTIMECOUNT = TRIGGERTIMECOUNT + 1;
        If (TRIGGERTIMECOUNT >= MAXTRIGGERTIMECOUNT)
            TRIGGERTIME = MINTRIGGERTIME;
        TRIGGER ( );
    }
}
TRIGGER ( )
{
    TOTALCOUNT = 0;
    Flush all of the ID queues 110 starting with the ID queue 110
selected as indicated by the signal STARTQUEUE (e.g., the circuit
110i).
}
```

However, the present invention may be implemented via any appropriate logic and/or routine to meet the design criteria of a particular application.

The present invention generally provides apparatus (e.g., the circuit 100) and/or a method (e.g., the method 200) for (i) sorting and coalescing IO requests by device ID and (ii) simultaneously flushing and releasing the respective device queues. The apparatus may be implemented as a set of inter-processor queues (e.g., the device queues 110) that may have one dedicated queue per SCSI device ID on the IOP (e.g., sender) side of the queues, and a single queue (e.g., the CTX manager request queue 104) on the context manager (e.g., receiver) side of the queue.

The apparatus or inter-processor queue manager 100 of the present invention may coalesce the requests from separate device ID queues 110*a*–110*n* (e.g., the signals Q) into the single request queue 104 request signal (e.g., the signal Q__COL) that the CTX manager accesses (or reads). The present invention may be configured such that each respective CTX manager receives IO requests already sorted (e.g., grouped by ID) and has only one request queue to process (e.g., the queue signal Q_COL). The present invention may provide a faster and more efficient method (e.g., the method 200) of processing IO requests (e.g., the request signals Q) than conventional approaches.

The circuit 112 may be configured to check the next IO request on the queue circuit 110i to determine whether or not the queue request is being sent to the same device ID as corresponding to the current device ID queue that was immediately previously removed (or released) from the queue. When sequential device queue request signals (e.g., the signals Q) reference the same device, the circuit 112 may present the IO requests to the device with the SPI L_Q information unit type field set to multiple (or multi-) command (e.g., multiple commands or multiple I/O requests may be sent to the device in the same connection or process step). The multi-command is generally compliant with the industry standards published in the SCSI Parallel Interface 4 (e.g., SPI-4) document.

Each of the queues 110 may be configured to operate as a first-in first-out memory (e.g., FIFO). The method 200 of the present invention may coalesce the IO requests Q such that performance is not hindered. Rather, the sorting and/or coalescing performed via the present invention may improve performance when compared to conventional approaches. The queue manager circuit 112 may be implemented as a hardware based state machine configured to execute tasks in parallel with the IOPs and CTX manager processors.

The queue manager 112 may collect new requests (e.g., the signals Q) and release them to the CTX manager without penalizing or delaying a single and/or sequential IO request operation. A single or sequential request generally occurs when the host operating system driver sends (or presents) an IO request and waits for the reply from the respective device before sending another IO request.

The queue manager 112 may have several modes of operation (e.g., states or steps of the method 200) during which the signal TRIGGER may be asserted. When the signal TRIGGER is asserted, the circuit 100 may be configured to flush the queues (e.g., release IO requests Q from the set of ID queues 110 to the single context manager queue 104 and the ID queue Q_COL from the circuit 104 to the CTX manager).

The signal TRIGGER is generally asserted in response to one or more variables (or parameters) (e.g., the signals or values MAXQUEUEDEPTH, TOTALCOUNT, TIME, TRIGGERTIME, MINTRIGGERTIME, MAXTRIGGERTIME, TRIGGERTIMECOUNT, STARTQUEUE, etc.). All the queues 110 and/or 104 may be flushed essentially simultaneously to reduce and/or prevent starvation of a particular ID queue and/or IO device. The signal STARTQUEUE may be implemented to indicate the first queue 110 to be flushed and flushing may continue with each ID queue 110 from left to right. The hardware queue manager 112 may check a predetermined routine each time the IOP where the present invention is implemented posts (or presents) a new IO request on an ID queue 110 Q (e.g., each time the signal NEWREQUEST is asserted). The routine may be implemented in accordance with one or more steps of the method 200.

The function performed by the (method, apparatus, process, etc.) of FIGS. 2-3 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMS, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of input/output (IO) queues each (i) capable of buffering a plurality of IO requests associated with a respective device identification and (ii) configured to and present said IO requests as buffered in response to a trigger signal; and
   a logic circuit configured to (i) generate a context queue request having said IO requests received from said IO queues (a) coalesced into a single sequence and (b) sorted in said sequence by said respective device identification and (ii) generate said trigger signal when a current queue count is equal to a maximum queue depth.

2. The apparatus according to claim 1, wherein said apparatus further comprises a context queue configured to receive said context queue request.

3. The apparatus according to claim 2, wherein said context queue is configured to present said context queue request to a context manager simultaneously with said IO queues receiving additional requests of said IO requests.

4. The apparatus according to claim 1, wherein said logic circuit is further configured to generate said trigger signal when (i) said current queue count is equal to a maximum total count, (ii) a total count is greater than said maximum total count, and (iii) a trigger time count is greater than or equal to a maximum trigger time count.

5. The apparatus according to claim 4, wherein said logic circuit is further configured to (i) reset said total count and said trigger time count to zero and (ii) set a trigger time to a minimum trigger time in response to said trigger signal.

6. The apparatus according to claim 1, wherein said context queue requests comprise signals compliant with a small computer systems interface (SCSI) parallel interface (SPI) L_Q multiple command.

7. An apparatus comprising:
   means for (i) receiving one or more IO requests and (ii) presenting said IO requests in response to a trigger signal;

means for serially coalescing said IO requests in response to a device identification (ID) of said IO requests;

means for presenting said coalesced IO requests as one or more respective context queue requests in response to said trigger signal;

means for generating said trigger signal when a current queue count is equal to a maximum queue depth; and means for sequentially presenting said context queue requests in response to said trigger signal.

8. A method for coalescing a plurality of input/output (IO) requests, comprising the steps of:

(A) first queuing said IO requests sorted by a plurality of device identifications (B) generating one or more context queue requests by serially coalescing said IO requests from said first queuing into a plurality of sequential groups each having one of said device identifications;

(C) second queuing said context queue requests; and (D) sequentially presenting said context queue requests from said second queuing to a context manager.

9. The method according to claim 8, further comprising the step of:

presenting said context queue requests from said second queuing simultaneously with said first queuing additional IO requests of said IO requests.

10. The method according to claim 8, wherein each of said IO requests is presented from said first queuing by respective IO request queues in response to a trigger signal.

11. The method according to claim 10, further comprising the step of:

generating said trigger signal when a current queue count equals a maximum total count.

12. The method according to claim 10, further comprising the step of:

generating said trigger signal when a total count is greater than a maximum total count.

13. The method according to claim 10, further comprising the step of:

generating said trigger signal when a trigger time count is greater than or equal to a maximum trigger time count.

14. The method according to claim 12, further comprising the step of:

resetting said total count to zero in response to said trigger signal.

15. The method according to claim 13, further comprising the step of:

resetting said trigger time count to zero in response to said trigger signal.

16. The method according to claim 10, further comprising the step of:

setting a trigger time to a minimum trigger time in response to said trigger signal.

17. A computer readable medium containing one or more sets of computer executable instructions for performing the steps of claim 8.

18. The method according to claim 8, wherein said context queue requests comprise signals compliant with a small computer systems interface (SCSI) parallel interface (SPI) L_Q multiple command.

19. The method according to claim 10, further comprising the step of:

generating said trigger signal when a current queue count equals a maximum total depth.

20. The method according to claim 8, wherein said context queue request starts with an initial IO request of said IO requests stored by said first queuing.

* * * * *